(12) United States Patent
Kirstein

(10) Patent No.: US 7,568,009 B2
(45) Date of Patent: Jul. 28, 2009

(54) QUEUE RENDEZVOUS

(75) Inventor: Jack M. Kirstein, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 667 days.

(21) Appl. No.: 11/263,005

(22) Filed: Oct. 31, 2005

(65) Prior Publication Data

US 2006/0149865 A1 Jul. 6, 2006

Related U.S. Application Data

(63) Continuation-in-part of application No. 11/026,501, filed on Dec. 30, 2004, now Pat. No. 7,502,843.

(51) Int. Cl.
*G06F 15/16* (2006.01)

(52) U.S. Cl. ............... 709/206; 709/203; 709/223; 709/224; 707/10; 707/102; 707/104.1

(58) Field of Classification Search ........... 709/203, 709/202, 206, 213, 223, 224; 707/1, 10, 707/13, 102, 104.1
See application file for complete search history.

(56) References Cited

U.S. PATENT DOCUMENTS

| 5,261,069 | A | | 11/1993 | Wilkinson et al. ........... 395/425 |
| 6,058,389 | A | * | 5/2000 | Chandra et al. ................ 707/1 |
| 6,240,413 | B1 | | 5/2001 | Learmont ...................... 707/8 |
| 6,418,438 | B1 | | 7/2002 | Campbell ...................... 707/8 |
| 6,484,172 | B1 | | 11/2002 | Lee et al. ........................ 707/8 |
| 6,542,513 | B1 | * | 4/2003 | Franke et al. ................ 370/429 |
| 6,578,006 | B1 | | 6/2003 | Saito et al. ..................... 705/9 |
| 6,606,626 | B1 | | 8/2003 | Ponnekanti ..................... 707/8 |
| 6,665,678 | B2 | | 12/2003 | Ching Chen et al. ......... 707/100 |
| 6,999,997 | B2 | * | 2/2006 | Clarke et al. ................. 709/213 |
| 2003/0105800 | A1 | * | 6/2003 | Cullen ......................... 709/201 |
| 2003/0233522 | A1 | | 12/2003 | White et al. ................. 711/144 |
| 2004/0205066 | A1 | | 10/2004 | Bhattacharjee et al. ......... 707/8 |
| 2005/0131908 | A1 | * | 6/2005 | Buxton et al. ................. 707/10 |
| 2005/0138375 | A1 | | 6/2005 | Sadjadi ....................... 713/167 |
| 2005/0158883 | A1 | * | 7/2005 | Mukai ............................ 438/3 |
| 2005/0198155 | A1 | * | 9/2005 | Zakharoff .................... 709/206 |
| 2006/0059257 | A1 | * | 3/2006 | Collard et al. .............. 709/224 |
| 2007/0118601 | A1 | * | 5/2007 | Pacheco ..................... 709/206 |

OTHER PUBLICATIONS

Distributed Queues, http://www.churchillobjects.com/c/11028j.html, last accessed Jan. 31, 2006, (8 pgs).
iWay Intelligent Adapter for TIBCO, http://www.iwaysoftware.com/pdf/tech$_{13}$ brief/TIBCO__TB.pdf, (3 pgs).
Resurrecting Ada's Rendez-Vous in Java, http://www.dcc.uchile.cl/~lmateu/pub/mateu-piquer-leon-rendezvous.pdf, (7 pgs).

* cited by examiner

*Primary Examiner*—Lashonda T Jacobs
(74) *Attorney, Agent, or Firm*—Merchant & Gould, P.C.

(57) ABSTRACT

Queue rendezvous services allow mutual exclusion of processing of certain message types in a generic way without unnecessarily tying up queue resources while waiting for certain conditions to be met and without requiring a queue client to implement application locks to support mutual exclusion processing rules.

20 Claims, 6 Drawing Sheets

QUEUE RENDEZVOUS

RELATED APPLICATIONS

The present application is a continuation-in-part of U.S. patent application Ser. No. 11/026,501, filed Dec. 20, 2004, which is incorporated by reference and claims the benefit of the earlier filing date under 35 U.S.C. § 120.

BACKGROUND

Queuing systems allow several different users (and/or processes) to send data and/or processing requests to be stored in a queue for later use by a receiving subsystem. For example, various project server subsystems can send one or more messages to the queuing system. The queuing system stores the information in separate queues until the receiving subsystem can retrieve and process the stored information. However, there can be any number of instances of a queue, and these instances are typically fully independent of each other and have no knowledge of any other existing queue instances.

SUMMARY

This summary is provided to introduce a selection of concepts in a simplified form that are further described below in the Detailed Description Section. This summary is not intended to identify key features or essential features of the claimed subject matter, nor is it intended to be used as an aid in determining the scope of the claimed subject matter.

According to aspects of various described embodiments, implementations are provided for a system for implementing a queue rendezvous. A queue rendezvous object is used to receive primary message information for a specific rendezvous and maintain status information for the received primary message information. First and second queues are used to employ rules and maintain lists for specifying message types that are mutually exclusive with a primary message type in the specific rendezvous. The queues are further used to receive a primary message type request, receive status information from the queue rendezvous object, and apply rules in response to the received primary message type request.

According to another aspect, a computer-implemented method for implementing a queue rendezvous includes receiving primary message information for a specific rendezvous and maintaining status information for the received primary message information. A primary message type request is received by the first and second queues and queued therein. Rules are applied by the queues in response to receiving the primary message type request.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Embodiments may be implemented as a computer process, a computer system (including mobile hand-held computing devices) or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Exemplary Queuing System Server

Figure 1:
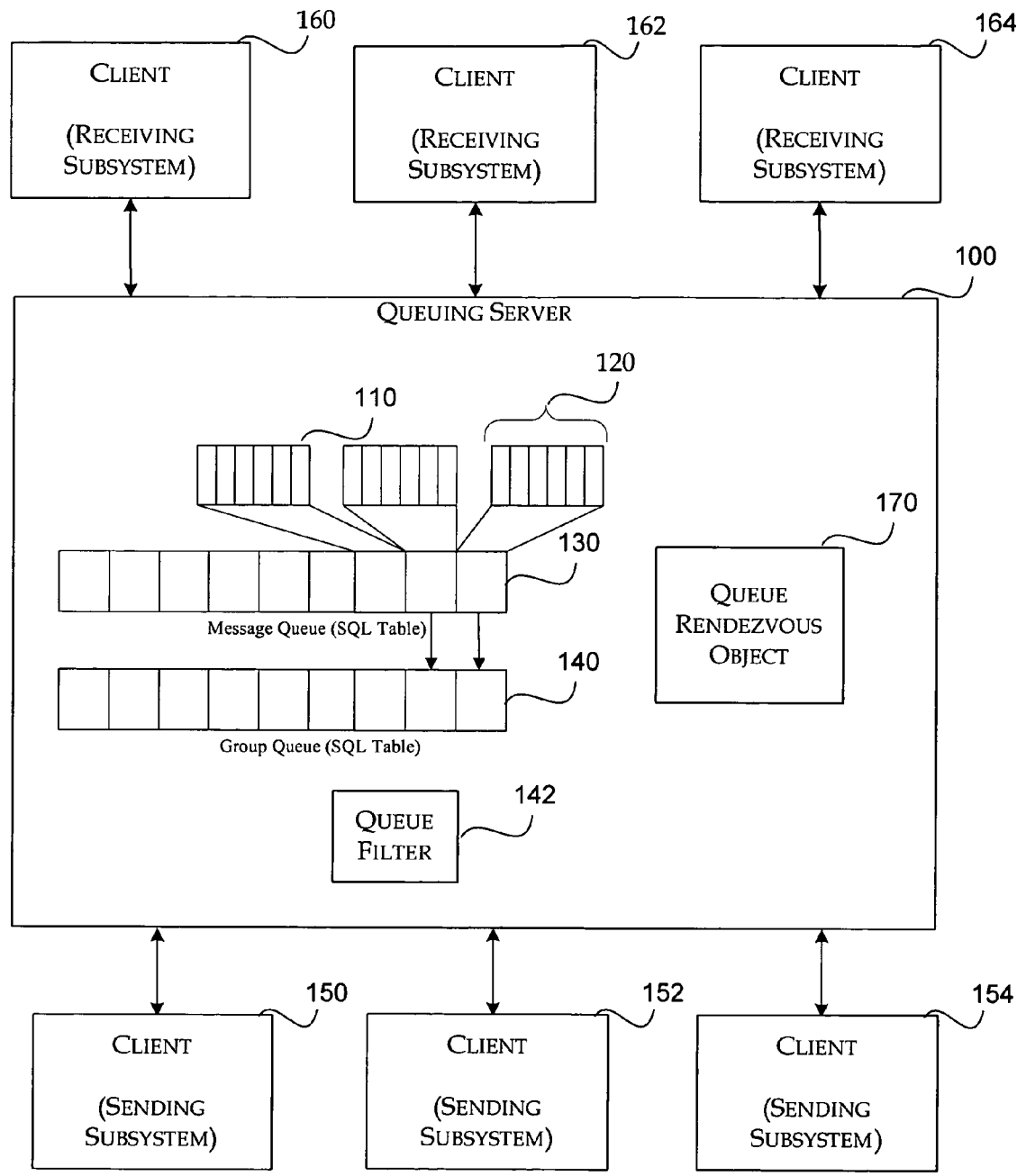
FIG. 1 illustrates a operation diagram of a queuing system for reliable message transport.

FIG. 1 illustrates a operation diagram of a queuing system for reliable message transport. The example system includes queuing server 100, sending subsystem clients 150, 152, 154, receiving subsystem clients 160, 162, 164, and queue rendezvous table 170. (Other systems may contain one or more sending subsystem clients and/or one or more receiving subsystem clients.)

Server 100 includes one or more stored messages, which are organized as message groups 110. Message groups 110 are stored in message queue 130 (such as an SQL table) with each message group being associated with an entry in group queue 140 (which can also be an SQL table, for example). A queue filter 142 (discussed below) is associated with each message queue 130. Multiple instances of queue filter 142 often exist such that each queue instance is independent from any other queue instance.

Within each queue there are logical groupings called correlations, which are virtual queues within a given queue. Message groups that have the same correlation are processed in a predetermined order (by taking queue order and group priority into account). The message groups on different correlations are treated as unrelated and thus can be processed in parallel.

When certain message types are mutually exclusive (for example, save and publish commands), the message types are typically correlated (i.e., they are put on the same correlation). Save and publish commands typically do not happen simultaneously for the same project, but are rather processed in parallel for different projects (which are on different correlations). However, certain message types may require mutual exclusion with other message types across multiple correlations. It is also possible these excluded message types can be distributed across multiple queues.

Queue rendezvous is a mechanism within queuing server 100 that allows some message types to be processed in a mutually exclusive manner with one or more message types, regardless of the correlation of the messages, either within a single instance of the queue or across multiple instances of queues. Where there are multiple instances of a queue, the instances are typically fully independent of each other and have no knowledge of any other existing queue instances.

Queue rendezvous implements rules such that particular message group types are processed mutually exclusively from one or more other message group types, across arbitrary instances of an MSPSQS queue, while leaving each queue instance unaware and independent of other queue instances. The mutual exclusion of processing of certain message types is accomplished in a generic way that does not "tie up" queue resources while waiting for certain conditions to be met, and does not request a queue client to implement application locks to support mutual exclusion processing rules.

An example scenario for which message group types are processed mutually exclusively comprises reporting database services ("RDS") from which a "cube" (i.e., a three dimensional object) is to be built. A "CBSRequest" (which reads from the reporting database) cannot usually be safely processed while any RDS messages (which update the reporting database) are running. RDS messages can be processed in both queues depending on what type of RDS update is being done. RDS messages correlated with a specific project are processed in the ProjectQ, whereas RDS messages correlated with timesheet data are processed in the TimesheetQ. As described in the example below, the queue rendezvous provides a mechanism to meet this requirement with minimal extra work required by the queue clients and no logical locks required by the clients.

How the message types are to be handled is accomplished by specifying processing rules for a queue client (such as CBSRequest). In this example, CBSRequest commands are to be mutually exclusive with "ProjectQ" message types and "TimesheetQ" message types. TimesheetQ message types include commands such as: RDSTimesheetSubmit, RDSTimesheetAdjust, RDSTimesheetStatusChange, RDSTimesheetPeriodModify, RDSTimesheetClassCreate, RDSTimesheetDelete, RDSTimesheetPeriodDelete, and RDSFiscalPeriodsChange. ProjectQ message types include commands such as: ReportingProjectPublish, ReportingLookupTableChange, ReportingCustomFieldMetadataChanged, ReportingResourcesChanged, ReportingBaseCalendarChanged, ReportingResourcesCapacityRangeChanged, and ReportingAttributeSettingsChanged.

When CBSRequest commands are to be implemented using a queue rendezvous, two queue message classes are written, one for each queue. Writing the two queue message classes specifies that the enqueued message types are being mutually exclusive with CBSRequest processing. Each message type first calls a queue API for each of the queues, and then makes a final sequence of calls to a queue rendezvous object. The final sequence of calls comprises the messages CBSProjRendezvousMessage (CBSRequest ProjectQ Rendezvous) and CBSTsRendezvousMessage (CBSRequest TimesheetQ Rendezvous).

The message type that is to go into the same queue as the Primary Message (CBSProjRendezvousMessage in this case) is the first message in a CBSRequest message group. Messages that go into other queues (TimesheetQ in this case) have their own message group types. In this example, a message group type CBSTsRendezvous is defined for messages that are to be enqueued in TimesheetQ.

A handler for CBSTsRendezvous is hooked into the TimesheetQ and a handler clause for the CBSProjRendezvousMessage is added to the CBSRequest message group handler. The CBSProjRendezvousMessage handler clause processes the message and changes the state of the CBSRequest message group to OnHold (using an API call to the queuing system services).

To enqueue a CBSRequest, each queue is informed that a Rendezvous Group is being sent (which is normally a single API call for each involved queue). Next, the CBSTsRendezvous message group is sent to the TimesheetQ using the standard queue sender API. The message group is initiated for the CBSRequest using the standard queue sender API to send the CBSProjRendezvousMessage message. Any other messages required by a CBSRequest are sent and the message group is closed. Finally, the Rendezvous Group is launched with a single queue API call.

Exemplary Queue Rendezvous Code for a Queuing System Server

Queue Rendezvous can be implemented per the below schema for a queue rendezvous object (170) and a queue filter (142) that is associated with each message queue 130. Queue rendezvous object 170 serves as the communication channel between multiple queues. The table itself may exist in a Project Server Published database (although other locations are possible), and a database view (with the same name as the table) may exist in every other database which hosts a queue. An example schema for queue rendezvous object 170 is:

```
CREATE TABLE dbo.MSP_QUEUE_RENDEZVOUS
(
    RENDEZVOUS_UID           UID NOT NULL,
    RENDEZVOUS_MSG_TYPE      INT NOT NULL,
    MSG_TYPE                 INT NOT NULL,
    QUEUE_ID                 INT NOT NULL,
    RENDEZVOUS_STATE         INT DEFAULT 0
)
```

Each queue has a filter table. This table specifies the message types (FILTERED_MSG_TYPE) that are mutually exclusive with the primary message type (RENDEZVOUS_MSG_TYPE) in a specific rendezvous (RENDEZVOUS_UID). An example schema for queue filter object 142 is:

```
CREATE TABLE dbo.MSP_<queuename>_FILTER
(
    RENDEZVOUS_UID           UID NOT NULL,
    RENDEZVOUS_MSG_TYPE      INT NOT NULL,
    FILTERED_MSG_TYPE        INT NOT NULL,
    FILTER_IS_ACTIVE         FLAG DEFAULT 0
)
```

The .MSP_<queuename>_GROUP table (which is associated with the .MSP_<queuename>_FILTER having the same <queuename>) is augmented with a RENDEZVOUS_UID column, which is non-null when the group is involved in a rendezvous.

Using the CBSRequest example given above for an enqueuing operation, a first step required is to notify the queue about the rendezvous group. Because the CBSRequest puts message groups in both the TimesheetQ and ProjectQ, it obtains a sender object for each using the usual queuing services API. The CBSRequest uses each sender object to make a call to the following example API:

```
public void RequestQueueRendezvous(Guid rendezvousUID,
QueueConstants.QueueMsgType,
    rendezvousMsg, QueueConstants.QueueMsgType msgType)
// example
Guid rendezvousUID = Guid.NewGuid( );
projectQSender.RequestQueueRendezvous(rendezvousUID,CBSRequest
,CBSRequest);
timesheetQSender.RequestQueueRendezvous(rendezvousUID,CBSReque-
st, CBSTsRendezvous);
```

The code informs the queue of the two message groups involved in the rendezvous group. In particular, it adds two entries into the MSP_QUEUE_RENDEZVOUS table. The first three parameters (RENDEZVOUS_UID, RENDEZVOUS_MSG_TYPE, and MSG_TYPE) of the table are filled with the corresponding parameters in the RequestQueueRendezvous API. The value for Queue_ID is set to a value representing the queue in which the message type goes. This value can be automatically assigned in response to what sender is used. The RENDEZVOUS_STATE column is typically set to Initialized.

Redacted (for simplicity) example code for standard use of the queuing services API is given as follows:

```
projectQSender.BeginMessageGroup(CBSRequest, rendezvousUID,
other-parameters...)
projectQSender.Send(new CBSProjRendezvousMessage ( ));
projectQSender.Send(new CubeBuildingRequest( ));
projectQSender.EndMessageGroup ( )
timesheetQSender.BeginMessageGroup(CBSTsRendezvous,
rendezvousUID, other-parameters...)
timesheetQSender.Send(new CBSTsRendezvousMessage ( ));
timesheetQSender.EndMessageGroup( );
```

With the execution of sender.EndMessageGroup( ), a group is marked as "ReadyForProcessing," and the queue would normally be assigned to the group. However, when message group is part of a rendezvous group, the queue is not assigned to the group. The queue does not pick up any message group whose RendezvousUID has a RENDEZVOUS_STATE of Initialized.

Once all parts of a rendezvous group are safely in the queue, the client "Launches" the rendezvous with the following sender API:

```
public void LaunchQueueRendezvous(Guid rendezvousUID)
//example
projectQSender.LaunchQueueRendezvous(rendezvousUID)
```

This code marks the rendezvous group as being "ready" in a single transaction by updating the RENDEZVOUS_STATE in the MSP_QUEUE_RENDEZVOUS table to be "Launched". The queue can then pick up the messages in the rendezvous group.

As with any message class in the queue system, an implementer for rendezvous messages has wide latitude as to how to implement the message class itself and the handler. Often, it is useful to put all or most of the code to handle the message in the message class itself. By putting the code in the message class itself, the message handler can usually be more easily written to deserialize the message object and to call one or more methods. An example implementation of the CBSProjRendezvousMessage follows:

```
[Serializable]
public class CBSProjRendezvousMessage
{
  public CBSProjRendezvousMessage( )
  {
  }
  public void HandleMessage(PlatformContext context,
IQueueAccess queueAccess,
    Guid rendezvousUID, MessageContext mContext)
    {
    // set up the filters
    queueAccess.AddRendezvousFilter(rendezvousUID,
       QueueConstants.QueueMsgType.CBSRequest,
       QueueConstants.QueueMsgType.ReportingProjectPublish)
    ;
    queueAccess.AddRendezvousFilter(rendezvousUID,
       QueueConstants.QueueMsgType.CBSRequest,
       QueueConstants.QueueMsgType.ReportingLookupTableChan-
    ge);
    queueAccess.AddRendezvousFilter(rendezvousUID,
       QueueConstants.QueueMsgType.CBSRequest,
       QueueConstants.QueueMsgType.ReportingCustomFieldMeta
    dataChanged);
    queueAccess.AddRendezvousFilter(rendezvousUID,
       QueueConstants.QueueMsgType.CBSRequest,
       QueueConstants.QueueMsgType.ReportingResourcesChange-
    d);
    queueAccess.AddRendezvousFilter(rendezvousUID,
       QueueConstants.QueueMsgType.CBSRequest,
       QueueConstants.QueueMsgType.ReportingBasecalendarCha-
    nged);
    queueAccess.AddRendezvousFilter(rendezvousUID,
       QueueConstants.QueueMsgType.CBSRequest,
       QueueConstants.QueueMsgType.ReportingResourcesCapaci-
    tyRangeChanged);
    queueAccess.AddRendezvousFilter(rendezvousUID,
       QueueConstants.QueueMsgType.CBSRequest,
       QueueConstants.QueueMsgType.ReportingAttributeSettin-
    gsChanged);
    // now make the filter come alive
    queueAccess.ActivateRendezvousFilter(rendezvousUID);
    // record that this queue has processed the rendezvous
message
    queueAccess.RecordQueueRendezvous(rendezvousUID,
       QueueConstants.QueueMsgType.CBSRequest,
       QueueConstants.QueueID.ProjectQ,
       QueueConstants.RendezvousState.Docking)
    mContext.OnHold = true;
  }
}
```

-continued

```
    An example implementation of CBSTsRendezvousMessage follows:
[Serializable]
public class CBSTsRendezvousMessage
{
    public CBSTsRendezvousMessage( )
    {
    }
    public void HandleMessage(PlatformContext context,
IQueueAccess queueAccess,
        Guid rendezvousUID, MessageContext mContext)
    {
        // set up the filters
        // one for each message which cannot run while
CBSRequest is running
        queueAccess.AddRendezvousFilter(rendezvousUID,
            QueueConstants.QueueMsgType.CBSRequest,
            QueueConstants.QueueMsgType.RDSTimesheetSubmit);
        queueAccess.AddRendezvousFilter(rendezvousUID,
            QueueConstants.QueueMsgType.CBSRequest,
            QueueConstants.QueueMsgType.RDSTimesheetAdjust);
        queueAccess.AddRendezvousFilter(rendezvousUID,
            QueueConstants.QueueMsgType.CBSRequest,
            QueueConstants.QueueMsgType.RDSTimesheetStatusChange
        );
        queueAccess.AddRendezvousFilter(rendezvousUID,
            QueueConstants.QueueMsgType.CBSRequest,
            QueueConstants.QueueMsgType.RDSTimesheetPeriodModify
        );
        queueAccess.AddRendezvousFilter(rendezvousUID,
            QueueConstants.QueueMsgType.CBSRequest,
            QueueConstants.QueueMsgType.RDSTimesheetClassCreate)
        ;
        queueAccess.AddRendezvousFilter(rendezvousUID,
            QueueConstants.QueueMsgType.CBSRequest,
        QueueConstants.QueueMsgType.RDSTimesheetDelete);
        queueAccess.AddRendezvousFilter(rendezvousUID,
            QueueConstants.QueueMsgType.CBSRequest,
            QueueConstants.QueueMsgType.RDSTimesheetPeriodDelete
        );
        queueAccess.AddRendezvousFilter(rendezvousUID,
            QueueConstants.QueueMsgType.CBSRequest,
            QueueConstants.QueueMsgType.RDSFiscalPeriodsChange);
        // now make the filter come alive
        queueAccess.ActivateRendezvousFilter(rendezvousUID);
        // record that this queue has processed the rendezvous
message
        queueAccess.RecordQueueRendezvous(rendezvousUID,
            QueueConstants.QueueMsgType.CBSTsRendezvous,
            QueueConstants.QueueID.TimesheetQ,
            QueueConstants.RendezvousState.Docking);
    }
}
    Three APIs are used in the example. The first API,
void AddRendezvousFilter(Guid rendezvousUID,
    QueueConstants.QueueMsgType rendezvousMsg,
    QueueConstants.QueueMsgType filteredMsg);
``` is called multiple times in each message. Each call to this API adds an entry into the MSP_<queue>_FILTER table. The parameters to this API correspond to the first three parameters in the example table. The fourth parameter, FILTER_IS_ACTIVE, is set to zero. The set of calls to this API set up a list of messages which are mutually exclusive to CBSRequest but initially have no effect on queue behavior in this example because the filter is inactive.

The next API called is:

void ActivateRendezvousFilter(Guid rendezvousUID);
This API activates all filters for the given rendezvousUID in a single transaction. After this call, the queue will normally no longer pick up filtered messages, or messages that happen to be behind a filtered message type on the same correlation as that message.

The final API call is:

```
    void RecordQueueRendezvous(Guid rendezvousUID,
        QueueConstants.QueueMsgType msgType,
        QueueConstants.QueueID queueId,
        QueueConstants.RendezvousState state);
```

This call updates the entry in MSP_QUEUE_RENDEZVOUS with the corresponding RENDEZVOUS_UID, QUEUE_ID, and MSG_TYPE values and sets the RENDEZVOUS_STATE value to "Docking." This notifies the queue that the filter is in place, but the rendezvous group is not yet ready to be picked up by the queue.

In CBSProjRendezvousMessage, the last statement is:
mContext.OnHold=true;

This code directs the queue to put this message group on hold. This is typically done in the case of CBSProjRendezvousMessage because it is the first message in the CBSRequest group. The group is put on hold until the queue determines that the rendezvous is "Ready" at which time the queue will release the group. This is typically not done for rendezvous messages which are in their own group.

Exemplary Queue Rendezvous for a Queuing System Server

After the messages and handlers have been initialized and a rendezvous group is sent as described in the example above, the queue can retrieve and process the messages. When the TimesheetQ picks up the CBSTsRendezvous, the handler for this message calls CBSTsRendezvousMessage.HandleMessage( ), which sets up and activates the filter and records the rendezvous as being in "Docking" state. The TimesheetQ can then handle the next message, but ordinarily will not pick up any new messages whose types are being filtered because the filter is in place and active.

Messages are handled by ProjectQ in a similar manner. ProjectQ receives the CBSRequest message and begins processing messages, with the first message being the CBSProjRendezvousMessage. The CBSProjRendezvousMessage message also sets up and activates a filter and records the rendezvous as being in "Docking" state. Next, the CBSProjRendezvousMessage puts the group on hold. The queue will then ordinarily drop the group without further processing and will move on to other available jobs.

The queue comprises a Receiver thread, with which it polls the queue for work to do. In addition to this primary task, this thread does some work related to rendezvous. The queue looks for entries in MSP_QUEUE_RENDEZVOUS, where for the given queue (e.g, TimesheetQ or ProjectQ) the state is "Docking" and the associated entries in the MSP_<queue>_FILTER table are active. The queue then looks to see if there are any filtered jobs that are currently being processed by the queue. If not, the queue will typically set the MSP_QUEUE_RENDEZVOUS entry to "Ready".

Although filtered groups would not be processed ordinarily if a filter has already been set up, there may be groups that have been processing from before the filter is first activated. Thus the filter works to prevent the queue from picking up new jobs of the filtered types. It does not typically terminate already processing jobs of the filtered types. The execution of the rendezvous messages sets the state to "Docking" and waits for the queue to complete any filtered groups before the rendezvous is normally ready to be processed.

The queue looks for entries in MSP_QUEUE_RENDEZVOUS where, for a given rendezvousUID, all entries are marked as "Ready." When this condition is true, it signifies that filters are set up in all relevant queues, that there are no processing jobs of the filtered types, and that there exists a rendezvous group that is "OnHold."

When the rendezvous is in the "Ready" state, the mutual exclusion condition is satisfied, and the queue then releases the appropriate "OnHold" group. The queue then picks up this group in the normal manner and begins processing. Because the first message, CBSProjRendezvousMessage, was processed when the group was put OnHold, the group will normally begin processing with the second message and proceed until the last message.

When the last message is processed, the queue performs cleanup of rendezvous related work items. The queue looks for entries in the MSP_<queue>_FILTER table for which there are no matching records in MSP_QUEUE_RENDEZVOUS and deletes any such filter records in response.

The queue spawns a thread as it typically does with all message groups. The thread is spawned to handle a message group such that the thread completes when the appropriate queue handler has finished processing of the group.

There are a number of states in which the group could be upon completion of processing such as Successful, Skipped, Failed but not operationing (includes GroupAborted), Failed and operationing (includes GroupAborted), and Canceled.

In all cases except Failed and Operationing states, the queue marks the group state appropriately and the corresponding entries in the MSP_QUEUE_RENDEZVOUS table are deleted. During its next cycle through the Receiver thread loop, the queue reinitializes the filters that had been set up for this group. Reinitializing the filters makes any previously filtered messages available for processing again.

In the case of the Failed and Operationing states, no action is usually taken because the group can be "Unlocked" by the queue administrator and the queue can once again retry the failed message.

To demonstrate the making of a message like CBSRequest mutually exclusive with some other set of messages in both queues an example is given below. Here, we assume that CBSRequest is to be mutually exclusive with all TsRDS and ProjRDS groups. In table 1, two example queues are shown with their respective messages:

| TimesheetQ | ProjectQ |
|---|---|
| TsRDS_1 | ProjRDS_1 |
| TsRDS_2 | ProjRDS_2 |
| CBSTsRendezvous | CBSRequest |
| TsRDS_3 | ProjRDS_3 |
| TsRDS_4 | ProjRDS_4 |
| Unrelated_Job1 | Unrelated_Job2 |

In this example, each queue can process 3 messages at the same time so that TimesheetQ will normally pick up TsRDS_1, TsRDS_2, and CBSTsRendezvous simultaneously. Assuming that CBSTsRendezvous completes processing first, this particular part of the rendezvous is marked as Docking, and the filter is in place. The queue will not pick up any more commands related to TsRDS-type jobs. It will, however, pick up Unrelated_Job1 and begin processing it. Once TsRDS_1 and TsRDS_2 have completed processing, the queue sets the TimesheetQ portion of the rendezvous to "Ready" in response.

The messages in ProjectQ are handled in a similar manner. The queue will normally pick up ProjRDS_1, ProjRDS_2, and CBSRequest simultaneously. The first message in CBSRequest is a CBSProjRendezvousMessage, which sets up a filter, marks the rendezvous as "Docking", and puts the group on hold. At this point in time, the queue contains CBSRequest (which is OnHold), and ProjRDS_3 and ProjRDS_4 (both of which are excluded by the filter). Accordingly, the only job the queue can pick up is Unrelated_Job2. Once ProjRDS_1 and ProjRDS_2 complete, the queue can mark this portion of the rendezvous as "Ready."

At this point, all parts of the rendezvous are marked "Ready", so the queue can then change the status of CBSRequest from OnHold to RendezvousReady. When the status of CBSRequest is RendezvousReady, the job is available to the queue for processing. It can then pick up the job and process it.

Once the CBSRequest is complete, the queue marks the group with the appropriate status (for example, Success) and unless its status is FailedandOperationing, the queue will normally delete all entries from MSP_QUEUE_RENDEZVOUS with a matching rendezvousUID. Each queue (TimesheetQ and ProjectQ) searches for filters for which no matching entries exist in MSP_QUEUE_RENDEZVOUS and in response, deletes the searched-for filters. When the searched for filters are deleted, TsRDS_3 and TsRDS_4 are once again available for processing to the TimesheetQ, and ProjRDS_3 and ProjRDS_4 are available for processing to the ProjectQ.

While the above example shows how CBSRequest can be made to be exclusive to the RDS messages, it is not necessary to set up filters to have RDS messages be exclusive with CBSRequest. RDS messages do not need such filters because the queue can pick up a CBSRequest while RDS messages are processing. When the CBSRequest is picked up, the queue initially just sets up a filter and goes OnHold. The queue won't typically process the CBSRequest until there are no RDS messages processing, so the CBSRequest doesn't run while RDS messages are running.

Because of the multiple queue operation allowed by QRZ, there are some complications involving canceling rendezvous groups, purging rendezvous groups, and rendezvous groups that complete with at status fail-but-not-operation. As in the example above, assume that the CBSTsRendezvous was canceled before being processed, but the CBSRequest was not canceled. It would seem that this would mean the rendezvous could never fully complete and there would be a filter set up in the ProjectQ which would never clear.

However, the queue rendezvous system handles such problems by using the RENDEZVOUS_STATE column in the MSP_QUEUE_RENDEZVOUS table to allow the queues to communicate information and by the following set of rules:

1. Any group that has a non-null RENDEZVOUS_UID is to have an associated entry in the MSP_QUEUE_RENDEZVOUS table. If the queue picks up a group and this condition is not met, then the group is marked as "canceled" without further processing. This situation is referred to as "Invalid Rendezvous"
2. For any group which has a non-null RENDEZVOUS_UID when picked up by the queue, all entries in MSP_QUEUE_RENDEZVOUS are to have a RENDEZVOUS_STATE set to "Ready." If this condition is not met, the queue marks the group as "canceled" without any further processing. This is another situation where we have "Invalid Rendezvous"
3. If a non-primary message (e.g., CBSTsRendezvous in the above example) is canceled, purged, or completes processing with a status of "failed-but-not-operation", the queue marks its associated entry in MSP_QUEUE_RENDEZVOUS to Canceled, Purged, or Failed respectively 4. If a primary group (e.g., CBSRequest) is canceled, purged, or completes processing with a status of "failed-but-not-operation", the queue deletes all entries for the groups RENDEZVOUS_UID from the MSP_QUEUE_RENDEZVOUS table.
5. If the queue notices that any entry in MSP_QUEUE_RENDEZVOUS for a given rendezvousUID is marked as Canceled, Purged, or Failed, and a group with the given rendezvousUID exists and is OnHold, the queue is to release this group for processing.
6. If the queue notices that any filter exists where no corresponding entry exists in MSP_QUEUE_RENDEZVOUS, it deletes the filter.

To illustrate the above rules, a few examples are given. If the CBSTsRendezvous group is canceled, the queue would mark its associated entry as "Canceled" (because rule 2 applies). In the ProjectQ, if the CBSRequest group has not yet been initially picked up, and when the queue does pick it up, it cancels the group (by applying rule 2 and rule 4). If the CBSRequest had already been initially picked up and put on hold, then rule 5 would apply (which would cause the queue to release the group for processing), followed by rule 4. Finally, rule 6 is applied, which clears up any existing filters.

In an example changing the scenario in the above example, assume the CBSRequest was canceled before CBSTsRendezvous was processed. Rule 4 would apply in the canceling of the CBSRequest. When the TimesheetQ picks up CBSTsRendezvous, rule 1 would apply and the group is cancelled. Applying rule 6 ensures that no filters remain.

Figure 2:
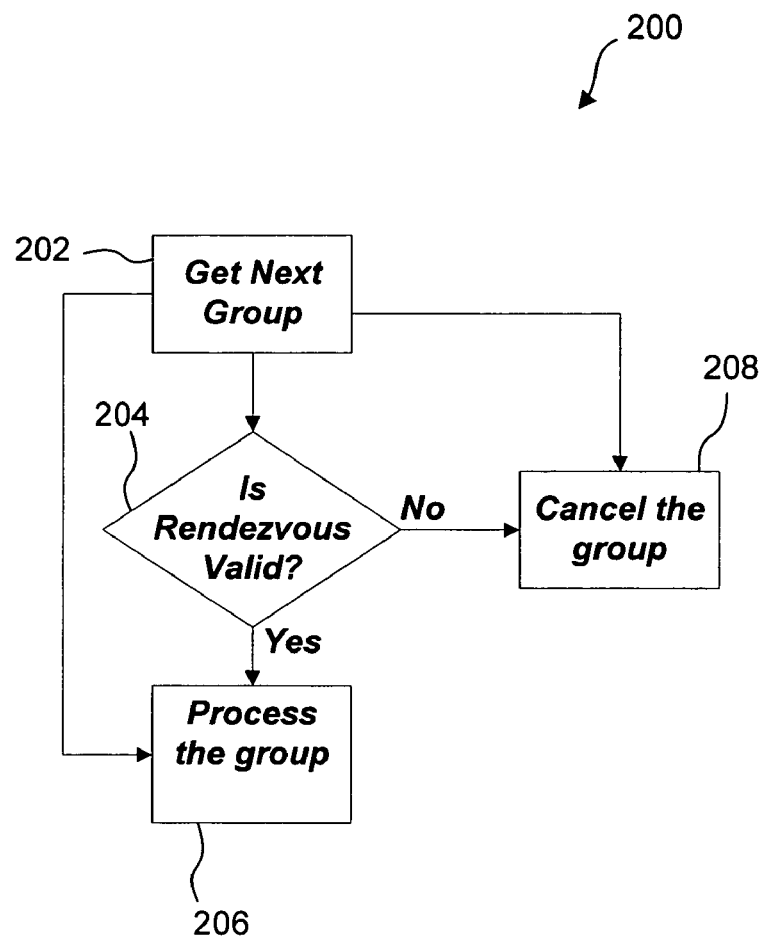
FIG. 2 illustrates an operational flow 200 for invalid rendezvous handling.

FIG. 2 illustrates an operational flow 200 for invalid rendezvous handling. At operation 202, a rendezvous group is obtained. At operation 204, a determination is made as to whether the rendezvous operation is valid (as described above). If the rendezvous group is valid, the rendezvous group is processed (at operation 206). If the rendezvous group is invalid, the rendezvous group is cancelled as described above (at operation 208).

Figure 3:
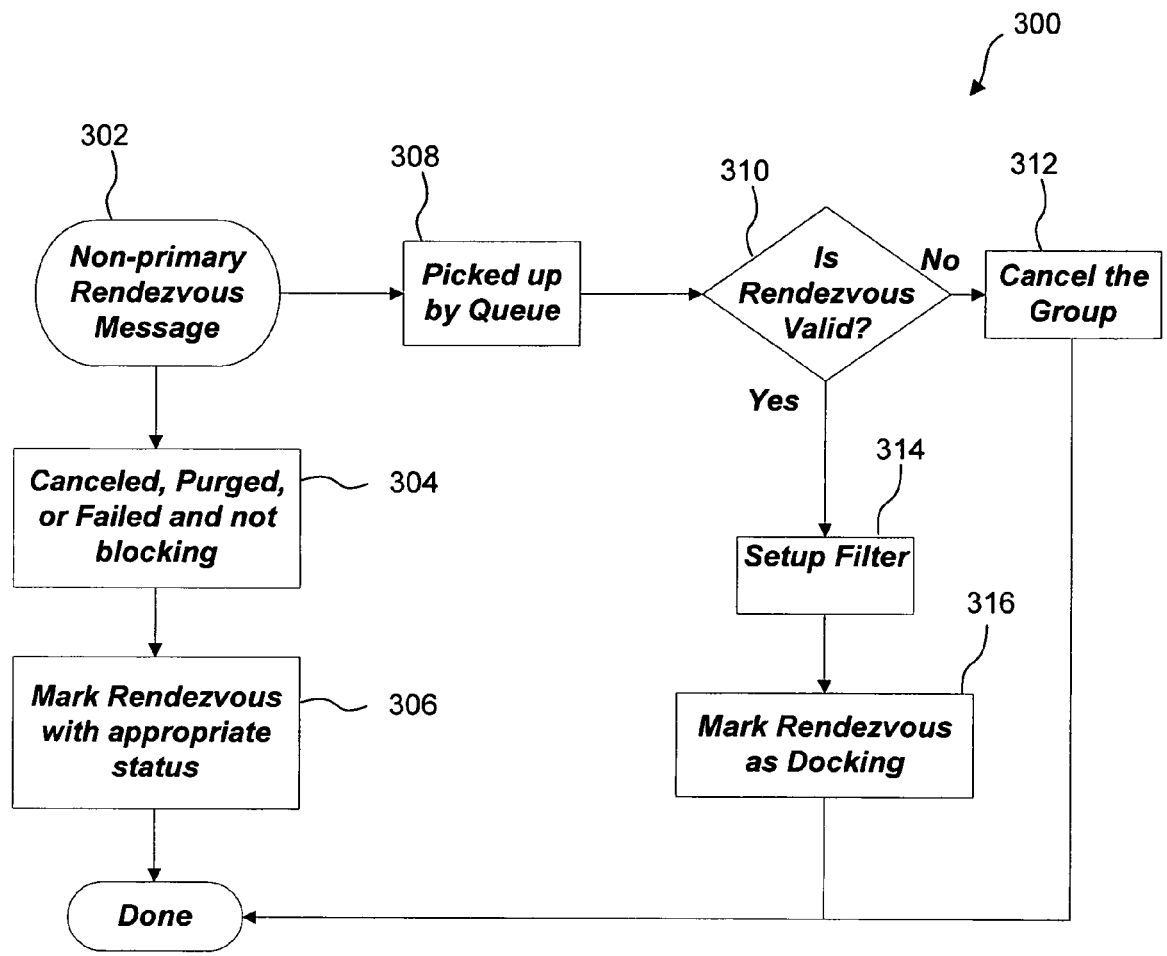
FIG. 3 illustrates an operational flow 300 for rendezvous processing for a non-primary rendezvous message group.

FIG. 3 illustrates an operational flow 300 for rendezvous processing for a non-primary rendezvous message group. At operation 302, a non-primary rendezvous group is obtained. At operation 304, the queue rendezvous system determines a status for the non-primary rendezvous message. If the non-primary rendezvous message status is cancelled, purged, failed, or not operationing, the rendezvous group is marked with the appropriate status (operation 306).

At operation 308 (in parallel with the processing at 302), the non-primary rendezvous group is picked up by the queue. At operation 310, a determination is made as to whether the rendezvous operation is valid. If the rendezvous group is invalid, the rendezvous group is cancelled as described above (at operation 312). If the rendezvous group is valid, a filter is setup for the rendezvous group (at operation 314). At operation 316, the rendezvous status is marked as Docking.

Figure 4:
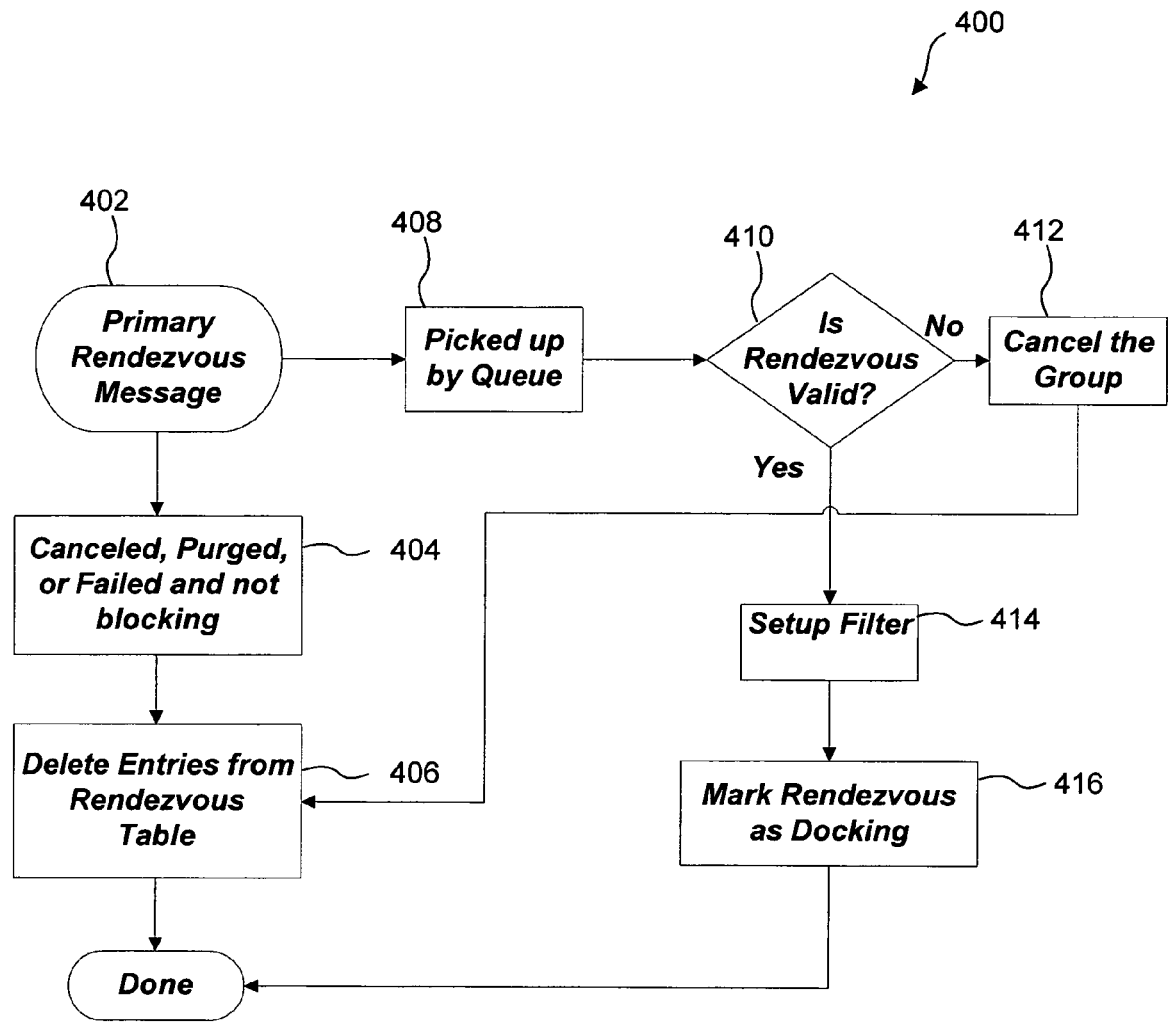
FIG. 4 illustrates an operational flow 400 for rendezvous processing for a primary rendezvous message group.

FIG. 4 illustrates an operational flow 400 for rendezvous processing for a primary rendezvous message group. At operation 402, a primary rendezvous group is obtained. At operation 404, the queue rendezvous system determines a status for the non-primary rendezvous message. If the non-primary rendezvous message status is cancelled, purged, failed, or not operating, the rendezvous group is deleted from the rendezvous table (operation 406).

At operation 408 (in parallel with the processing at 402), the non-primary rendezvous group is picked up by the queue. At operation 410, a determination is made as to whether the rendezvous operation is valid. If the rendezvous group is invalid, the rendezvous group is cancelled (at operation 412) and associated table entries are deleted (at operation 406). If the rendezvous group is valid, a filter is setup for the rendezvous group (at operation 414). At operation 416, the rendezvous status is marked as Docking.

Figure 5:
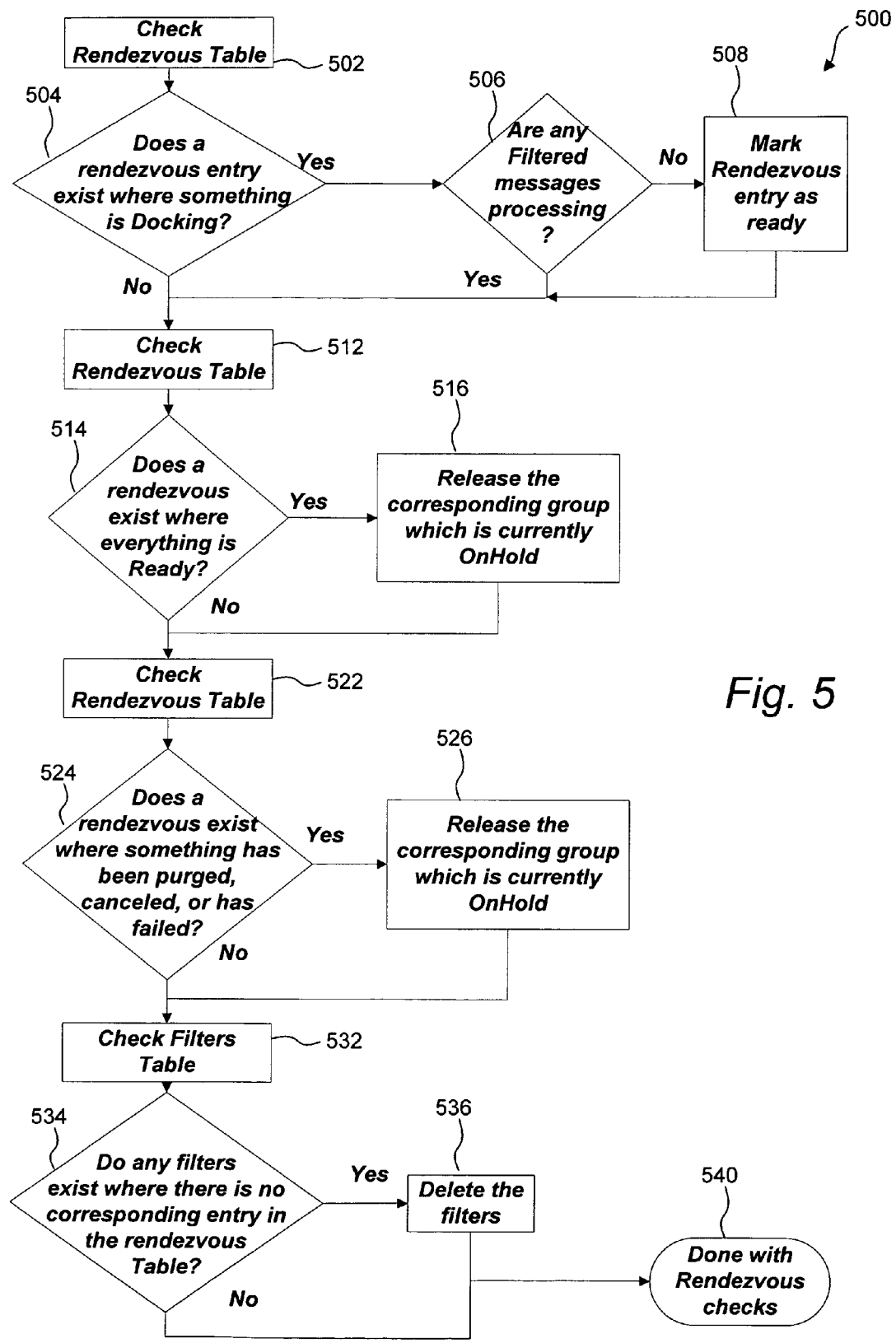
FIG. 5 illustrates an operational flow 500 for queue processing of the queue rendezvous table.

FIG. 5 illustrates an operational flow 500 for queue processing of the queue rendezvous table. At operation 502, the queue checks the queue rendezvous table. At operation 504, the queue determines whether an entry in the table has a status of docking. If the queue determines that no entry in the table has a status of docking, process flow continues at operation 512. If any filtered messages are processing (operation 506), the rendezvous entry is marked as ready (operation 508) and processing continues at operation 512.

At operation 512, the queue checks the queue rendezvous table to determine (at operation 514) whether all entries in the table are ready. If the queue determines that not all of the entries in the table are ready, process flow continues at operation 522. If all entries in the table are ready, the corresponding group that is currently on hold is released (operation 516) and processing continues at operation 522.

At operation 522, the queue checks the queue rendezvous table to determine (at operation 524) whether a rendezvous exists where an entry has been purged, canceled, or has failed. If the queue determines no entry has been purged, canceled, or has failed, process flow continues at operation 532. If a rendezvous entry has been purged, canceled, or has failed, the corresponding group that is currently on hold is released (operation 526) and processing continues at operation 532.

At operation 532, the queue checks the filters table to determine (at operation 534) whether there are any filters in the filters table for which there is no corresponding entry in the rendezvous table. If the queue determines there are no filters in the filters table for which there is no corresponding entry in the rendezvous table, process flow continues at operation 540. If there are any filters in the filters table for which there is no corresponding entry in the rendezvous table, the filters are deleted (operation 536) and processing continues at operation 522. At operation 540, processing is completed.

Illustrative Operating Environment

Figure 6:
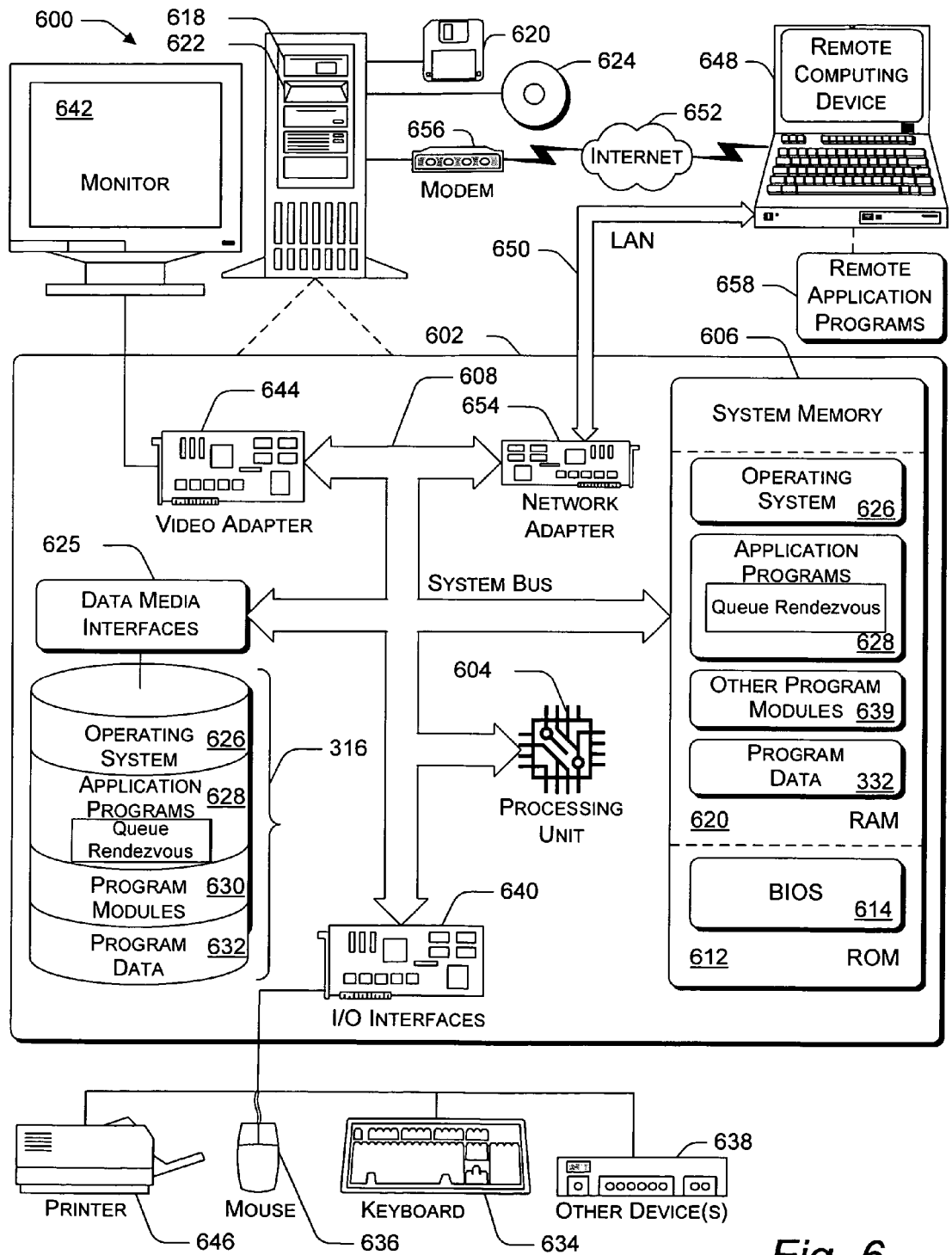
FIG. 6 illustrates a general computer environment 600, in accordance with aspects of the present invention.

FIG. 6 illustrates a general computer environment 600, which can be used to implement the techniques described herein. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the example computer environment 600.

Computer environment 600 includes a general-purpose computing device in the form of a computer 602. The components of computer 602 can include, but are not limited to, one or more processors or processing units 604, system memory 606, and system bus 608 that couples various system components including processor 604 to system memory 606.

System bus 608 represents one or more of any of several types of bus structures, including a memory bus or memory controller, a peripheral bus, an accelerated graphics port, and a processor or local bus using any of a variety of bus architectures. By way of example, such architectures can include a Peripheral Component Interconnects (PCI) bus also known as a Mezzanine bus, a PCI Express bus (and the like), a Universal Serial Bus (USB), a Secure Digital (SD) bus, and/or an IEEE 1394, i.e., FireWire, bus.

Computer 602 may include a variety of computer readable media. Such media can be any available media that is accessible by computer 602 and includes both volatile and nonvolatile media, removable and non-removable media.

System memory 606 includes computer readable media in the form of volatile memory, such as random access memory (RAM) 610; and/or non-volatile memory, such as read only memory (ROM) 612 or flash RAM. Basic input/output system (BIOS) 614, containing the basic routines that help to transfer information between elements within computer 602, such as during start-up, is stored in ROM 612 or flash RAM. RAM 610 typically contains data and/or program modules that are immediately accessible to and/or presently operated on by processing unit 604.

Computer 602 may also include other removable/non-removable, volatile/non-volatile computer storage media. By way of example, FIG. 6 illustrates hard disk drive 616 for reading from and writing to a non-removable, non-volatile magnetic media (not shown), magnetic disk drive 618 for reading from and writing to removable, non-volatile magnetic disk 620 (e.g., a "floppy disk"), and optical disk drive 622 for reading from and/or writing to a removable, non-volatile optical disk 624 such as a CD-ROM, DVD-ROM, or other optical media. Hard disk drive 616, magnetic disk drive 618, and optical disk drive 622 are each connected to system bus 608 by one or more data media interfaces 625. Alternatively, hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, removable magnetic disk 620, and removable optical disk 624, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 616, magnetic disk 620, optical disk 624, ROM 612, and/or RAM 610, including by way of example, operating system 626, one or more application programs 628 (which can include queue rendezvous services as described above), other program modules 630, and program data 632. Each of such operating system 626, one or more application programs 628, other program modules 630, and program data 632 (or some combination thereof) may implement all or part of the resident components that support the distributed file system.

A user can enter commands and information into computer 602 via input devices such as keyboard 634 and a pointing device 636 (e.g., a "mouse"). Other input devices 638 (not shown specifically) may include a microphone, joystick, game pad, satellite dish, serial port, scanner, and/or the like. These and other input devices are connected to processing unit 604 via input/output interfaces 640 that are coupled to system bus 608, but may be connected by other interface and bus structures, such as a parallel port, game port, or a universal serial bus (USB).

Monitor 642 or other type of display device can also be connected to the system bus 608 via an interface, such as video adapter 644. In addition to monitor 642, other output peripheral devices can include components such as speakers (not shown) and printer 646 which can be connected to computer 602 via I/O interfaces 640.

Computer 602 can operate in a networked environment using logical connections to one or more remote computers, such as remote computing device 648. By way of example, remote computing device 648 can be a PC, portable computer, a server, a router, a network computer, a peer device or other common network node, and the like. Remote computing device 648 is illustrated as a portable computer that can include many or all of the elements and features described herein relative to computer 602. Alternatively, computer 602 can operate in a non-networked environment as well.

Logical connections between computer 602 and remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, computer 602 is connected to local area network 650 via network interface or adapter 654. When implemented in a WAN networking environment, computer 602 typically includes modem 656 or other means for establishing communications over wide area network 652. Modem 656, which can be internal or external to computer 602, can be connected to system bus 608 via I/O interfaces 640 or other appropriate mechanisms. It is to be appreciated that the illustrated network connections are examples and that other means of establishing at least one communication link between computers 602 and 648 can be employed.

In a networked environment, such as that illustrated with computing environment 600, program modules depicted relative to computer 602, or portions thereof, may be stored in a remote memory storage device. By way of example, remote application programs 658 reside on a memory device of remote computer 648. For purposes of illustration, applications or programs and other executable program components such as the operating system are illustrated herein as discrete operations, although it is recognized that such programs and components reside at various times in different storage components of computing device 602, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A computer-implemented system for queuing messages, comprising:
   a queue rendezvous object that is configured to receive primary message information for a specific rendezvous and maintain status information for the received primary message information; wherein the queue rendezvous object implements rules such that particular message group types are processed mutually exclusively from one or more other message group types while leaving a first queue unaware and independent of a second queue; wherein the queue rendezvous object serves as a communication channel between the first queue and the second queue;
   the first queue that is configured to store messages; wherein the first queue comprises a first queue filter that comprises rules and a list for specifying message types that are mutually exclusive with a primary message type in the specific rendezvous, wherein the first queue is configured to receive a primary message type request, receive status information from the queue rendezvous object, and apply rules in response to the received primary message type request of the first queue filter; wherein the first queue picks up and processes messages within the first queue until a rendezvous message relating to the specific rendezvous is encountered; and when the rendezvous is encountered then only picking up and processing unrelated messages in the first queue until the rendezvous message has been processed; and
   the second queue that is configured to store messages; wherein the second queue comprises a second queue filter that comprises rules and a list for specifying message types that are mutually exclusive with a primary message type in the specific rendezvous, wherein the queue is configured to receive the primary message type request, receive status information from the queue rendezvous object, and apply rules in response to the received primary message type request of the second queue filter; wherein the second queue picks up and processes messages within the second queue until a second rendezvous message relating to the specific rendezvous is encountered; and when the second rendezvous message is encountered then only picking up and processing unrelated messages in the second queue until the rendezvous message has been processed.

2. The computer-implemented system of claim 1, wherein the specific rendezvous is assigned a unique identifier.

3. The computer-implemented system of claim 1, wherein the received primary message information comprises a unique identifier for the specific rendezvous and a primary message type.

4. The computer-implemented system of claim 1, wherein the first and second queue filters are activated with a single API call that comprises a unique identifier for the specific rendezvous.

5. The computer-implemented system of claim 4, wherein the status information for the received primary message information is changed to a docking-type status in response to the activation of the first and second queue filters.

6. The computer-implemented system of claim 5, wherein a selected queue from one of the first and second queues is further configured to change a status of a message group of the selected queue to an on-hold-type status in response to the change in the status information to "docking".

7. The computer-implemented system of claim 6 wherein the selected queue is further configured to receive a docking status notification from the queue rendezvous object and to change the status from the docking-type status to a ready-type status.

8. The computer-implemented system of claim 7, wherein the selected queue is further configured to release to change the status of the message group of the selected queue from the on-hold-type status to a released state in response to the change the status from the docking-type status to a ready-type status.

9. The computer-implemented system of claim 8, wherein the selected queue is further configured to process the message group of the selected queue in response to the change the status to a released state.

10. The computer-implemented system of claim 7, wherein the selected queue is further configured to delete entries in the selected queue filter for which there are no corresponding entries in the queue rendezvous object.

11. A system for queuing messages, comprising:
   means for receiving primary message information for a specific rendezvous and maintaining status information for the received primary message information; wherein the means for receiving primary message information for a specific rendezvous implements rules such that particular message group types are processed mutually exclusively from one or more other message group types while leaving a first queuing means unaware and independent of a second queuing means; wherein the queue rendezvous object serves as a communication channel between the first queuing means and the second queuing means;

the first queuing means that is configured to store messages and for receiving a primary message type request, for receiving status information for the received primary message information, and for applying rules in response to receiving a primary message type request; and the second queuing means that is configured to store messages and for receiving a primary message type request, for receiving status information for the received primary message information, and for applying rules in response to receiving a primary message type request; wherein the first queuing means and the second cueuing means picks up and processes messages within their queue until a rendezvous message relating to the specific rendezvous is encountered within their queue; and when the rendezvous message is encountered then only picking up and processing unrelated messages in the their queue until the rendezvous message has been processed.

12. The system of claim 11, wherein the specific rendezvous is assigned a unique identifier.

13. The system of claim 11, wherein the first and second queue queuing means are activated with a single API call that comprises a unique identifier for the specific rendezvous.

14. The system of claim 11, wherein a message group of the first queuing means is put on-hold until a mutual exclusion condition is satisfied.

15. The system of claim 14, wherein the first queuing means deletes entries in the first queuing means for which there are no corresponding entries in the means for receiving primary message information.

16. A computer-implemented method for managing a queuing system for messages, comprising:

receiving primary message information for a specific rendezvous and maintaining status information for the received primary message information;

receiving in a first queue a primary message type request, receiving status information in the first queue for the received primary message information, and for applying rules in the first queue in response to receiving a primary message type request; wherein the first queue includes messages and wherein the first queue picks up and processes messages within the first queue until a rendezvous message relating to the specific rendezvous is encountered; and when the rendezvous is encountered then only picking up and processing unrelated messages in the first queue until the rendezvous message has been processed; and receiving in a second queue a primary message type request, receiving status information in the second queue for the received primary message information, and for applying rules in the second queue in response to receiving a primary message type request; wherein the second queue includes messages and wherein the second queue picks up and processes messages within the second queue until a second rendezvous message relating to the specific rendezvous is encountered; and when the second rendezvous message is encountered then only picking up and processing unrelated messages in the second queue until the rendezvous message has been processed.

17. The method of claim 16, wherein the specific rendezvous is assigned a unique identifier.

18. The method of claim 16, further comprising activating the first and second queues with a single API call that comprises a unique identifier for the specific rendezvous.

19. The method of claim 16, further comprising putting a message group of the first queue "on-hold" until a mutual exclusion condition is satisfied.

20. The method of claim 16, further comprising receiving in a third queue a non-primary message type request, receiving status information in the third queue for the received primary message information, and for applying rules in the third queue in response to receiving a non-primary message type request.

* * * * *